(12) United States Patent
Tiwari et al.

(10) Patent No.: US 8,924,865 B1
(45) Date of Patent: Dec. 30, 2014

(54) DISPLAYING AN ANCESTRY GRAPH WITHIN A SOCIAL NETWORKING SERVICE

(75) Inventors: Prachi Tiwari, Los Altos, CA (US); Prasanthi Kolisetty, Fremont, CA (US)

(73) Assignee: Google Inc., Mountain View, CA (US)

( * ) Notice: Subject to any disclaimer, the term of this patent is extended or adjusted under 35 U.S.C. 154(b) by 169 days.

(21) Appl. No.: 13/603,340

(22) Filed: Sep. 4, 2012

(51) Int. Cl.
*G06F 3/14* (2006.01)

(52) U.S. Cl.
USPC ............... 715/753; 715/700; 726/3; 726/4; 707/668

(58) Field of Classification Search
CPC ..................... G06F 3/14; G06F 3/17
USPC .......... 715/200–277, 700–867; 700/701–866; 709/201–229; 705/50–79; 345/30–111; 707/668; 726/3, 4
See application file for complete search history.

(56) References Cited

U.S. PATENT DOCUMENTS

| 2010/0186066 A1* | 7/2010 | Pollard | 726/3 |
| 2010/0269158 A1* | 10/2010 | Ehler et al. | 726/4 |
| 2013/0318047 A1* | 11/2013 | Hale et al. | 707/668 |

* cited by examiner

*Primary Examiner* — Ruay Ho
(74) *Attorney, Agent, or Firm* — McDermott Will & Emery LLP

(57) ABSTRACT

Systems and methods for displaying an ancestry graph within a social networking service are provided. In some aspects, an indication of a subset of social contacts of the first user, where an ancestry of the first user includes the subset of the social contacts of the first user, and an indication of ancestry relationships between the first user and the subset of the social contacts of the first user are received, via an account associated with a first user of a social networking service. A first ancestry graph including representations of the subset of the social contacts of the first user and representations of the ancestry relationships among the subset of the social contacts are provided for display, via the account associated with the first user.

16 Claims, 7 Drawing Sheets

DISPLAYING AN ANCESTRY GRAPH WITHIN A SOCIAL NETWORKING SERVICE

BACKGROUND

The subject technology generally relates to social networking interfaces and, in particular, relates to displaying an ancestry graph within a social networking service.

Some people interact and share information related to their families via a social networking service, which allow users to share information with a group of their social contacts.

SUMMARY

In some aspects, the disclosed subject matter relates to a computer-implemented method. The method includes receiving, via an account associated with a first user of a social networking service, an indication of a subset of social contacts of the first user, where an ancestry of the first user includes the subset of the social contacts of the first user, and an indication of ancestry relationships between the first user and the subset of the social contacts of the first user. The method includes providing for display, via the account associated with the first user, a first ancestry graph including representations of the subset of the social contacts of the first user and representations of the ancestry relationships among the subset of the social contacts. The method includes providing for display, in association with the first ancestry graph, an ancestry graphical component corresponding to a predetermined time period. The ancestry graphical component includes indications of one or more changes to the first ancestry graph within the predetermined time period or indications of one or more posts within the social networking service associated with the subset of the social contacts. The one or more posts are associated with timestamps corresponding to the predetermined time period.

These and other embodiments can include one or more of the following features. The method may also include receiving, via an account associated with a member of the subset of the social contacts of the first user, a verification of an ancestry relationship between the first user and the member, and providing for display, in association with an account associated with a second user, a second ancestry graph for the first user, the second ancestry graph including a representation of the ancestry relationship between the first user and the member, where the second user has permission to view information about the first user and permission to view information about the member. The subset of social contacts of the first user may include a social circle of the first user. The method may also include receiving, via the account associated with the first user, an indication that the ancestry of the first user includes a person and an indication of an ancestry relationship between the first user and the person, where the person lacks an account in the social networking service, providing for display, within the first ancestry graph, an indication of the ancestry relationship between the first user and the person. The method may also include determining whether the person is eligible for an account in the social networking service, if the person is eligible for the account in the social networking service: associating a representation of the person on the first ancestry graph with a first color code, and providing, to an electronic messaging address of the person, an invitation to open the account in the social networking service, and if the person is ineligible for the account in the social networking service: associating the representation of the person on the first ancestry graph with a second color code, where the second color code is determined based on a reason for ineligibility of the person for the account in the social networking service. The reason for ineligibility of the person for the account in the social networking service may include one or more of: the person is deceased, the person is below a threshold age for joining the social networking service, or the person lacks a known electronic messaging address. The ancestry relationship may include one or more of: spouse, sibling, parent, or child.

The disclosed subject matter also relates to a computer-readable medium encoded with executable instructions. The instructions include code for receiving, via an account associated with a first user of a social networking service, an indication of a subset of social contacts of the first user, where an ancestry of the first user includes the subset of the social contacts of the first user, and an indication of ancestry relationships between the first user and the subset of the social contacts of the first user. The instructions include code for providing for display, via the account associated with the first user, a first ancestry graph including representations of the subset of the social contacts of the first user and representations of the ancestry relationships among the subset of the social contacts. The instructions include code for providing for display, in association with the first ancestry graph, an ancestry graphical component including additional information about the subset of social contacts of the first user.

These and other embodiments can include one or more of the following features. The ancestry graphical component may correspond to a predetermined time period, where the ancestry graphical component includes indications of one or more changes to the first ancestry graph within the predetermined time period or indications of one or more posts within the social networking service associated with the subset of the social contacts, and where the one or more posts are associated with timestamps corresponding to the predetermined time period. The instructions may also include code for receiving, via an account associated with a member of the subset of the social contacts of the first user, a verification of an ancestry relationship between the first user and the member, and providing for display, in association with an account associated with a second user, a second ancestry graph for the first user, the second ancestry graph including a representation of the ancestry relationship between the first user and the member, where the second user has permission to view information about the first user and permission to view information about the member. The subset of social contacts of the first user may include a social circle of the first user. The instructions may also include code for receiving, via the account associated with the first user, an indication that the ancestry of the first user includes a person and an indication of an ancestry relationship between the first user and the person, where the person lacks an account in the social networking service, providing for display, within the first ancestry graph, an indication of the ancestry relationship between the first user and the person. The instructions may also include code for determining whether the person is eligible for an account in the social networking service, if the person is eligible for the account in the social networking service: associating a representation of the person on the first ancestry graph with a first color code, and providing, to an electronic messaging address of the person, an invitation to open the account in the social networking service, and if the person is ineligible for the account in the social networking service: associating the representation of the person on the first ancestry graph with a second color code, where the second color code is determined based on a reason for ineligibility of the person for the account in the social networking service. The reason for ineligibility of the person for the account in the social networking service may include one or more of: the person is deceased, the person is below a threshold age for joining the social networking service, or the person lacks a known electronic messaging address. The ancestry relationship may include one or more of: spouse, sibling, parent, or child.

The disclosed subject matter further relates to a system. The system includes an ancestry setup module configured to receive, via an account associated with a first user of a social networking service, an indication of a subset of social contacts of the first user, where an ancestry of the first user includes the subset of the social contacts of the first user, and an indication of ancestry relationships between the first user and the subset of the social contacts of the first user. The system includes an ancestry graph display module configured to provide for display, via the account associated with the first user, a first ancestry graph including representations of the subset of the social contacts of the first user and representations of the ancestry relationships among the subset of the social contacts. The system includes an ancestry information display module configured to provide for display, in association with the first ancestry graph, an ancestry graphical component corresponding to a predetermined time period. The ancestry graphical component includes indications of one or more changes to the first ancestry graph within the predetermined time period or indications of one or more posts within the social networking service associated with the subset of the social contacts. The one or more posts are associated with timestamps corresponding to the predetermined time period. The system includes a third-party verification module configured to receive, via an account associated with a member of the subset of the social contacts of the first user, a verification of an ancestry relationship between the first user and the member. The system includes a third-party display module configured to provide for display, in association with an account associated with a second user, a second ancestry graph for the first user. The second ancestry graph includes a representation of the ancestry relationship between the first user and the member. The second user has permission to view information about the first user and permission to view information about the member.

These and other embodiments can include one or more of the following features. The subset of social contacts of the first user may include a social circle of the first user. The ancestry setup module may be further configured to receive, via the account associated with the first user, an indication that the ancestry of the first user includes a person and an indication of an ancestry relationship between the first user and the person, where the person lacks an account in the social networking service. The ancestry graph display module may be further configured to providing for display, within the first ancestry graph, an indication of the ancestry relationship between the first user and the person. The system may also include an eligibility determination module configured to: determine whether the person is eligible for an account in the social networking service, if the person is eligible for the account in the social networking service: associate a representation of the person on the first ancestry graph with a first color code, and provide, to an electronic messaging address of the person, an invitation to open the account in the social networking service, and if the person is ineligible for the account in the social networking service: associate the representation of the person on the first ancestry graph with a second color code, where the second color code is determined based on a reason for ineligibility of the person for the account in the social networking service. The reason for ineligibility of the person for the account in the social networking service may include one or more of: the person is deceased, the person is below a threshold age for joining the social networking service, or the person lacks a known electronic messaging address.

Advantageously, the ancestry graph and the ancestry graphical component may allow users of a social networking service to easily view information about their families or the families of their social contacts whose ancestry information they have permission to view. As a result, the users may become more engaged with the social networking service and may encourage their real-life contacts to join the social networking service.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

As set forth above, some people interact and share information related to their families via a social networking service, which allow users to share information with a group of their social contacts. However, social networking services may lack user interface elements to intuitively represent family or ancestry relationships. As the foregoing illustrates, an approach to displaying ancestry information via a social networking service may be desirable.

The subject technology is related to displaying an ancestry graph within a social networking service. In some aspects, a server receives, via an account associated with a first user of a social networking service, an indication of a subset of social contacts of the first user. An ancestry of the first user may include the subset of the social contacts of the first user. The server also receives an indication of ancestry relationships between the first user and the subset of social contacts of the first user. The server provides for display (e.g., on a display of a client computing device), via an account associated with the first user, a first ancestry graph (e.g., ancestry graph 102 of FIG. 1A) including representations of the subset of the social contacts of the first user and representations of the ancestry relationships among the subset of social contacts. The server provides for display (e.g., on the display of the client computing device), in association with the first ancestry graph, an ancestry graphical component (e.g., diary 122 of FIG. 1A) corresponding to a predetermined time period. The ancestry graphical component includes indications of one or more changes to the first ancestry graph within the predetermined time period or indications of one or more posts within the social networking service associated with the subset of social networking contacts. The one or more posts are associated with timestamps corresponding to the predetermined time period.

Figure 1A:
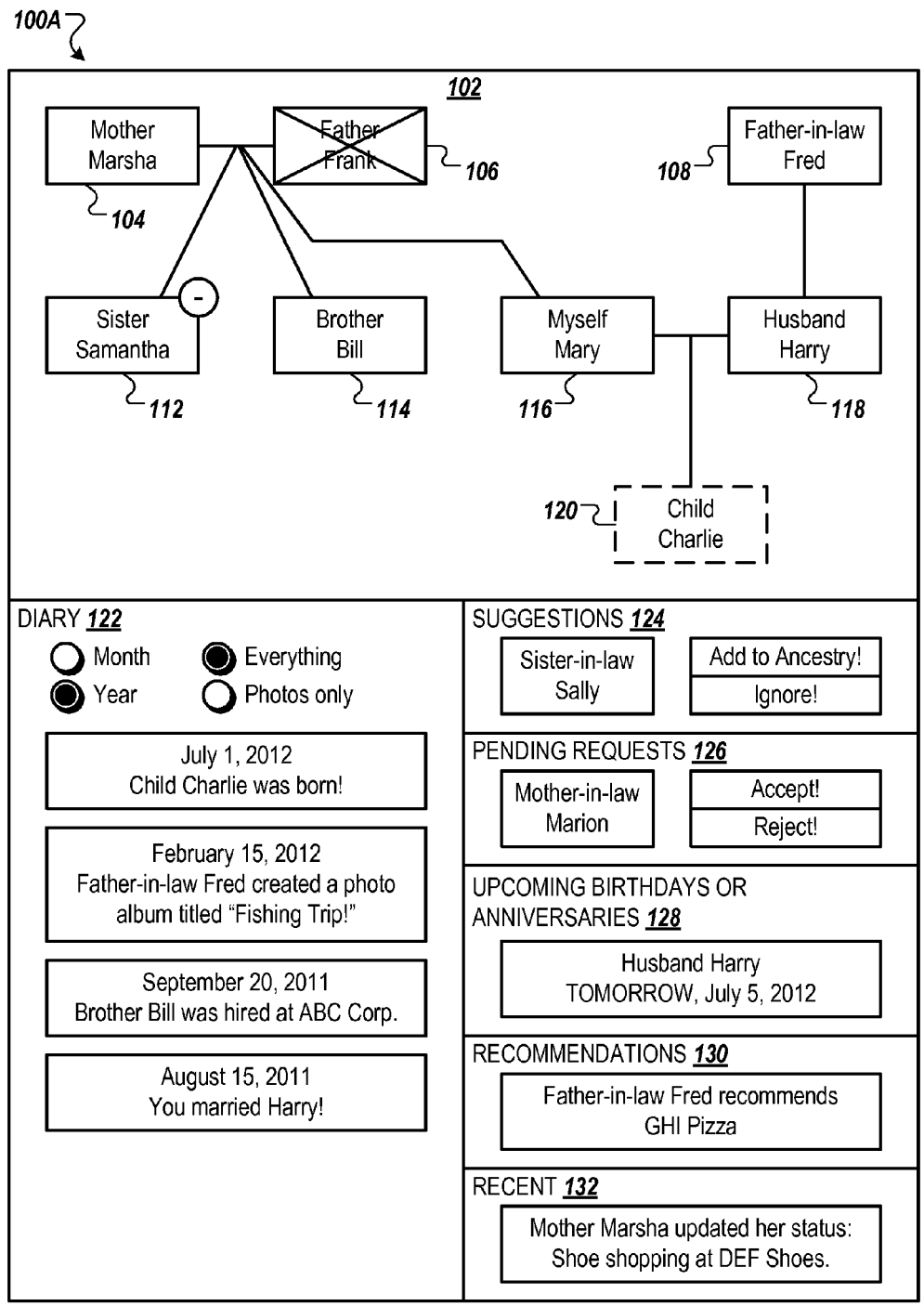
FIG. 1A illustrates an example ancestry page displayed within a social networking service.

FIG. 1A illustrates an example ancestry page 100A displayed within a social networking service.

The ancestry page 100A may be displayed via a client computing device (e.g., client computing device 230 of FIG. 2), for example via a web browser or a special purpose application (e.g., a mobile phone application, a personal digital assistant (PDA) application, or a tablet computer application). The special purpose application may be an application associated with the social networking service. The ancestry page 100A may be accessible via an account of a subject (i.e., the user whose ancestry is displayed) or via another account that has received permission from the subject to view the subject's ancestry via the social networking service.

As shown, the ancestry page 100A includes an ancestry graph 102, a diary 122, a suggestion region 124, a pending request region 126, an upcoming events region 128, a recommendations region 130, and a recent region 132.

The ancestry graph 102 includes a tree structure (e.g., a family tree) representing an ancestry of the user and the ancestry relationships between the members of the ancestry. As used herein, the term "ancestry" may include a set of family relationships by blood or marriage. The phrase "ancestry relationship" may refer to a family, blood, or marriage-based relationship between people. Examples of ancestry relationships include spouse (e.g., husband or wife), sibling (e.g., brother or sister), parent (e.g., mother or father), child (e.g., daughter or son), in-law (e.g., mother-in-law, father-in-law, sister-in-law, or brother-in law), grandparent (e.g., grandmother or grandfather), grandchild (e.g., daughter or son), etc. The tree structure may represent marriage relationships (e.g., via horizontal lines) and parent-child relationships (e.g., via combinations of lines at least one of which is not horizontal or via vertical lines).

The tree structure may include nodes 104, 106, 108, 112, 114, 116, 118, or 120 representing members of the ancestry. Each node may include one or more of a name of a member, an image associated with the member, or an indication of the ancestry relationship between the subject and the member. For example, node 104 includes the name of the member of the ancestry ("Marsha") and the ancestry relationship ("Mother") of the member of the ancestry to the subject ("Mary," as represented in node 116).

All or a portion of the nodes 104, 106, 108, 112, 114, 116, 118, or 120 in the ancestry graph 102 may be associated with members of the social networking service. As illustrated, nodes 104, 108, 114, 116, and 118 correspond to members of the social networking service. These nodes 104, 108, 114, 116, and 118 may be associated with a default shape (e.g., rectangle that is not crossed out with non-dashed lines and no minus sign) or a default color code.

The members of the ancestry who are members of the social networking service (e.g., Mother Marsha, Father-in-law Fred, Brother Bill, or Husband Harry) may correspond to a social circle of the subject (Mary). The social circle may be a "Family" social circle or an "Ancestry" social circle.

As used herein, "social circles" are categories to which a user can assign their social networking contacts and better control the distribution and visibility of social networking messages. In accordance with the subject disclosure, a social circle is provided as a data set defining a collection of contacts that are associated with one another. A social circle can be described from the perspective of an individual that is the center of a particular collection of socially interconnected people, or from the aggregate perspective of a collection of socially interconnected people. A social circle can have narrowly defined boundaries, all of the members of the social circle may be familiar with one another, and permission may be required for a member to join a social circle. A user of an electronic device may define a social circle, and the social circle, as a data set defining a collection of contacts, may reflect a real-life social circle of the user.

In one example, a user of an electronic device (e.g., client computing device 230 of FIG. 2) may have different groups of friends, coworkers and family, and there may be some overlap among those groups (e.g., a coworker who is also considered to be a friend, a family member who is also a coworker). Through the creation and use of social circles, the user can organize and categorize social networking contacts into various different groupings.

All or a portion of the nodes 104, 106, 108, 112, 114, 116, 118, or 120 in the ancestry graph 102 may be associated with non-members of the social networking service. As illustrated, nodes 106, 112, and 120 correspond to non-members of the social networking service. The nodes 106, 112, and 120 that are associated with non-members may be associated with a shape or color code different from the default shape or default color code. The shape or color code of the nodes 106, 112, and 120 that are associated with non-members may be based on whether the associated non-member is eligible for an account in the social networking service or a reason for ineligibility of the non-member for an account in the social networking service. For example, node 106 "Father Frank" is represented with an "X" across the node. The "X" may represent that Father Frank is deceased. Node 112 "Sister Samantha" is represented with a minus sign in a circle adjacent to the node. The minus sign may represent that Sister Samantha is eligible for an account in the social networking service but has not opened the account in the social networking service. Node 120 "Child Charlie" is represented with dashed lines around the node. The dashed lines may represent that Child Charlie is below a threshold age (e.g., thirteen years old) for joining the social networking service.

Alternatively, color codes may be used instead of or in conjunction with the symbols. For example, a white color code may replace or be used in conjunction with the rectangle that is not crossed out with non-dashed lines and no minus sign. A red color code may replace or be used in conjunction with the "X" across the node. A grey color code may replace or be used in conjunction with the minus sign in the circle adjacent to the node. A green color code may replace or be used in conjunction with the dashed lines around the node.

One or more of the nodes 104, 106, 108, 112, 114, 116, 118, or 120 may include or be associated with an image. For nodes of members of the social network 104, 108, 114, 116, or 118, the image may be the default image corresponding to the member (e.g., the image that appears adjacent to posts by the member). For nodes of non-members of the social network 106, 112, or 120, the image may be an image provided by the subject in conjunction with the indication that the non-member is a part of the subject's ancestry.

The ancestry page 100A also includes the diary 122. The diary 122 is a graphical component that allows the user viewing the ancestry page 100A to select, for example, via radio buttons, a time period (e.g., "month" or "year") and a type of notification (e.g., "everything" or "photos only"). The diary 122 may present data corresponding to the time period and the type of notification. The data may include one or more of text posts, image posts, video posts, audio posts, or information about changes to the ancestry graph 102. As shown, the diary 122 includes indications of changes to the ancestry graph 102—"You married Harry!" and "Child Charlie was born!"—indications of posts by members of the ancestry to the social networking service—"Father-in-law Fred created a photo album titled 'Fishing Trip!'"—and indications of changes to biographic information of members of the ancestry—"Brother Bill was hired at ABC Corp."

Information in the diary 122 may be sorted chronologically (as illustrated). Alternatively, information in the diary 122 may be sorted by time of the year (e.g., in December 2011, posts written in December 2010 or December 2009 may be presented above posts written in other months, as those posts may be more relevant to the December holidays) or by closeness in the family (e.g., information about the subject's siblings may be closer to the top than information about the subject's second cousins). In some examples, posts including videos or photographs or notifications of events may be placed closer to the top. Alternatively, posts of members of the ancestry who generate the most attention (i.e., the most popular members) may be placed closer to the top. Attention may be measured in terms of posts written in response to other posts. For example, if Brother Bill 114 frequently makes posts that generate feedback, the posts of Brother Bill 114 may be placed closer to the top of the diary 122. In yet other examples, affinity of the subject to members of the ancestry may be measured, for example, in terms of frequency of communications from the subject to the member. The frequency of communication may be weighted by time of communication (i.e., communications within the last week or month get a higher weight than communications that took place six or twelve months ago). Posts of members of the ancestry to whom the subject has a greater affinity may be placed closer to the top of the diary 122.

The ancestry page 100A also includes the suggestion region 124. The suggestion region 124 may include suggestions for new members of the ancestry graph 102 based on information stored within a server or a data repository of the social networking service (e.g., server 220 or data repository 210 of FIG. 2). For example, if Husband Harry 118 has an ancestry graph that indicates that Sally is his sister, "Sister-in-law Sally" may be suggested as an addition to the ancestry graph of the subject (Mary 116) of the ancestry graph 102 in the suggestion region 124. Husband Harry 118 needs to provide permission for his data to be used to provide suggestions to the subject for the purpose of expanding the subject's ancestry graph 102. Providing permission may refer to an affirmative act (e.g., selecting a radio button on a page within the social networking service). The subject may be presented with buttons to "add to ancestry" or "ignore" the suggestions presented to the subject in the suggestion region 124. If the subject Mary chooses to add Sally to the ancestry, the ancestry graph 102 may be update to reflect that Sally is Mary's sister-in-law.

The ancestry page 100A also includes the pending request region 126. The pending requests page may include requests by users of the social networking service other than the subject to add themselves to the ancestry graph 102 of the subject (e.g., if a user wants to make his/her own ancestry graph corresponding to that of the subject). As shown, the pending requests region includes a request to add "Mother-in-law Marion," which the subject may accept or reject. For example, Mother-in-law Marion may have indicated that Mary 116 is her daughter-in-law, and may want Mary to confirm this fact so that Marion and Mary can have corresponding ancestry graphs. If the subject Mary 116 accepts the pending request, the ancestry graph 102 may be updated to reflect that Marion is Mary's mother-in-law.

The ancestry page 100A also includes the upcoming events region 128. The upcoming events region 128 may indicate upcoming (e.g., within the next predetermined time period, e.g., week or month) birthday's or anniversaries of members of the ancestry graph 102, reducing the probability of the user forgetting about or ignoring an upcoming event. As shown, the upcoming event region 128 indicates that tomorrow is Husband Harry's Birthday.

The ancestry page 100A also includes the recommendations region 130. The recommendations region 130 may include one or more recommendations (e.g., "likes" or "+1's") by members of the ancestry graph 102 who are members of the social network. As shown, the recommendations region 130 indicates that Father-in-law Fred recommends GHI Pizza. Advantageously, the recommendations region 130 may allow users to easily the preferences of members of their ancestry, for example, when selecting gifts for the members of the ancestry or when planning a family reunion.

The ancestry page 100A also includes the recent region 132. The recent region 132 presents recent (e.g., within the last preset time period, e.g., hour, day, or week) activity by members of the ancestry graph 102 who are members of the social networking service. As shown, Mother Marsha 104 recently updated her status to "Shoe shopping at DEF Shoes."

As described above, the ancestry page 100A includes the ancestry graph 102, the diary 122, the suggestion region 124, the pending requests region 126, the upcoming events region 128, the recommendations region 130, and the recent region 132. However, the subject technology may be implemented without one or more of the regions 102, 122, 124, 126, 128, 130, or 132, or with any combination of one or more of the regions 102, 122, 124, 126, 128, 130, or 132.

Figure 1B:
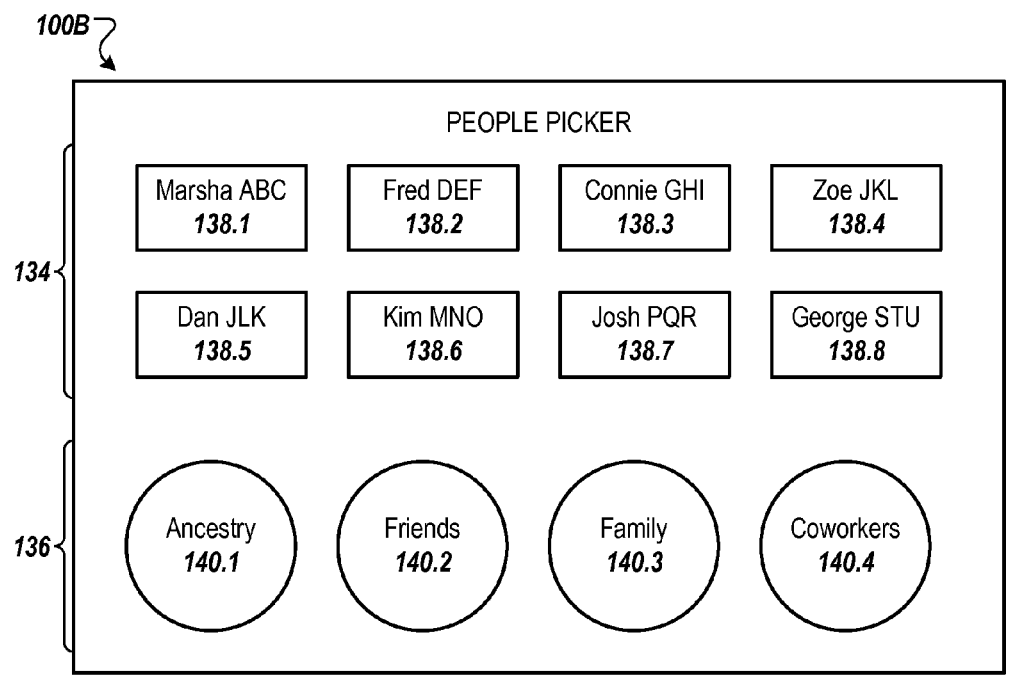
FIG. 1B illustrates an example page for selecting members of an ancestry.

FIG. 1B illustrates an example page 100B for selecting members of an ancestry.

As shown, the page 100B includes an entities region 134 and a social circles region 136.

The entities region 134 includes indications of entities 138.1-8. Each indication of an entity 138.$k$ may include one or more of a name, an electronic messaging (e.g., email) address, or an image corresponding to the entity. The entities 138.1-8 may correspond to members of the social networking service that are suggested social contacts for the user or that the user has indicated are his/her social contacts. In some aspects, the entities 138.1-8 may include people who are not members of the social network who are suggested social contacts of the user. The user must affirmatively opt-in to receiving suggested social contacts, or the user may opt-out of receiving suggested social contacts. While eight indications of entities 138.1-8 are illustrated here, the subject technology may be implemented with any number of indications of entities.

The social circles region 136 includes indications of social circles 140.1-4. The social circles 140.1-4 may include an ancestry social circle 140.1 and other social circles (e.g., friends, family, and coworkers) 140.2-4. To add an entity 130.k to a social circle 140.k, a user may select the entity 138.k and drag and drop the entity 138.k into the social circle 140.k. The selection may be accomplished using a cursor (on a computing device with a cursor) or a finger or stylus (on a computing device with a touch screen).

For example, to add entity "Marsha ABC" 138.1 to the ancestry circle 140.1, the user may select the indication of the entity 138.1 and drag and drop the entity 138.1 to the ancestry social circle 140.1. After the drag and drop is completed, the user may be prompted (e.g., via a pop-up window) to indicate his/her ancestry relationship (e.g., parent, sibling, etc.) with the entity 138.1 that was added to the ancestry social circle 140.1. If the contact information (e.g., social networking contact information or electronic messaging address) of the entity 138.1 is known, and the entity has provided permission for or not opted-out of the social networking service contacting him/her, the entity may be notified of the indicated ancestry relationship or prompted to verify the ancestry relationship indicated by the user. In some aspects, the user may be able to select multiple entities (e.g., both entities 136.1 and 136.2) and drag and drop the multiple entities simultaneously to a social circle 140.k.

Figure 2:
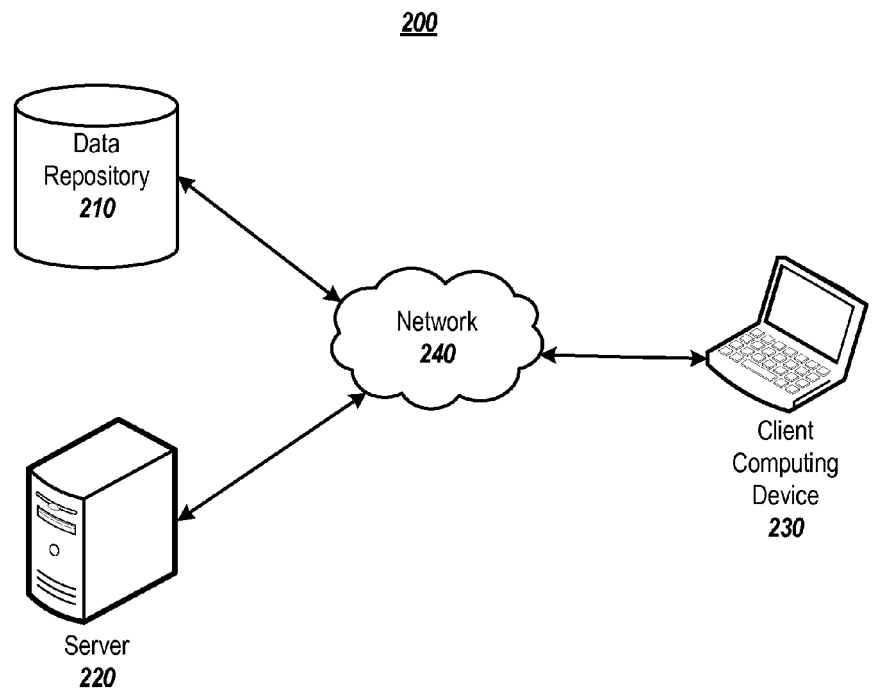
FIG. 2 illustrates an example of a system for displaying an ancestry graph within a social networking service.

FIG. 2 illustrates an example of a system 200 for displaying an ancestry graph within a social networking service. As shown, the system 200 includes a data repository 210, a server 220, and a client computing device 230. The data repository 210, the server 220, and the client computing device 230 may be configured to communicate with one another via a network 240. The network 240 may include the Internet, an intranet, a local area network, a wide area network, a wired network, a wireless network, or a virtual private network (VPN). While only one data repository 210, server 220, and client computing device 230 are illustrated, the subject technology may be implemented in conjunction with any number of data repositories 210, servers 220, or client computing devices 230. In some aspects, a single machine may implement the functions of two or more of the data repository 210, the server 220, or the client computing device 230.

The data repository 210 may store indications of accounts of members of a social networking service and related information (e.g., biographic data or posts of the members of the social network). One example of the data repository 210 is described in more detail in conjunction with FIG. 3 below.

The server 220 may include one or more modules for facilitating user interaction with the social networking service via a browser or a special purpose application executing on the client computing device 230. The server 220 may be implemented as a single machine with a single processor, a multi-processor machine, or a server farm including multiple machines with multiple processors. One example of the server 220 is described in more detail in conjunction with FIG. 4 below.

The client computing device 230 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 230 may include one or more of a keyboard, a mouse, a display, or a touch screen. The client computing device 230 may also include a web browser configured to display webpages, for example a webpage of the social networking service or the ancestry page 100A. Alternatively, pages associated with the social networking service or the ancestry page 100A may be presented on the client computing device 230 via a special purpose application, which may be associated with the social networking service.

Figure 3:
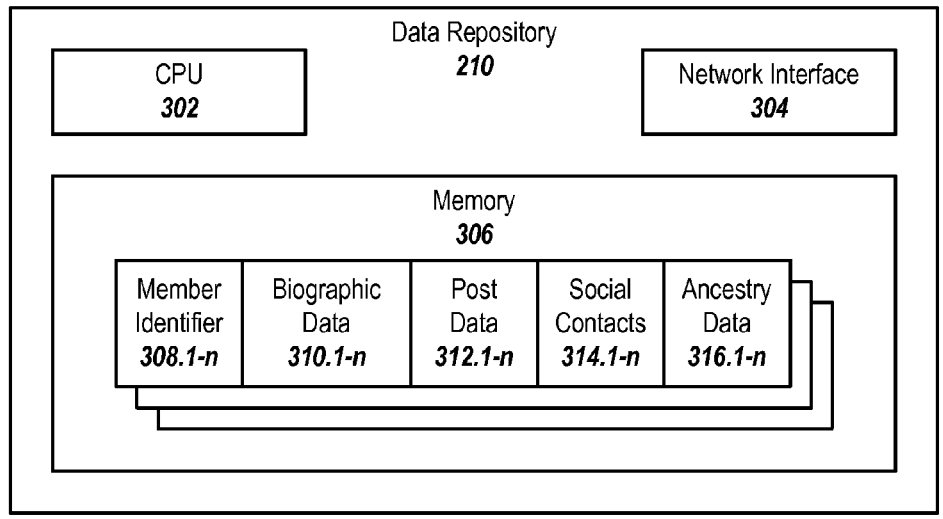
FIG. 3 illustrates an example of the data repository of FIG. 2.

FIG. 3 illustrates an example of the data repository 210 of FIG. 2. As shown, the data repository 210 includes a central processing unit (CPU) 302, a network interface 304, and a memory 306. The CPU 302 may include one or more processors. The CPU 302 is configured to execute computer instructions that are stored in a computer-readable medium, for example, the memory 306. The network interface 304 is configured to allow the data repository 210 to transmit and receive data in a network, e.g., network 240 of FIG. 2. The network interface 304 may include one or more network interface cards (NICs). The memory 306 stores data or instructions. The memory 306 may be one or more of a cache unit, a storage unit, an internal memory unit, or an external memory unit. As illustrated, the memory 306 includes member identifiers 308.1-$n$, which are associated with biographic data 310.1-$n$, post data 312.1-$n$, social contacts 314.1-$n$, and ancestry data 316.1-$n$.

The member identifiers 308.1-$n$ may correspond to any identifiers for a member of a social networking service, for example, a user identifier, a username, an account number, etc.

All or a portion of the member identifiers 308.1-$n$ are associated with biographic data 310.1-$n$, which may include, for example, a birthday, a marital status, an anniversary, current or former education, employment, or residence information, etc. The biographic data 310.1-$n$ may be provided to the social networking service by the user. The user may choose not to provide all or a portion of the requested biographic data 310.1-$n$ or not to share all or a portion of the biographic data 310.1-$n$ with other members of the social networking service or members of the user's social circles. For example, a user may choose not to provide his/her residence information, to share his/her current employment information with all members of the social networking service, and to share his/her birthday only with members of his/her social circles.

All or a portion of the member identifiers 308.1-$n$ are associated with post data 312.1-$n$. The post data 312.1-$n$ may include one or more posts by the members of the social networking service. The posts may be shared with all or a portion of the members of the social networking service. For example, a user may choose to share a post with members of one or more of his/her social circles. As with biographic data 310.1-$n$, a user may choose to share his/her post data with members of some of his/her social circles but not others. For example, a user may share a post or biographic data item with his/her "Family" social circle, but not with his/her "Coworkers" social circle.

One or more member identifiers 310.1-$n$ are also associated with social contacts 314.1-$n$. The social contacts may include one or more social circles, as set forth above.

One or more member identifiers 310.1-$n$ are also associated with ancestry data 316.1-$n$. The ancestry data 316.1-$n$ may be associated with an ancestry or family social circle of the member identifier 308.1-$n$. The ancestry data 316.1-$n$ may include indications of ancestry relationships between the member and other members of the social network or other people who are not members of the social network. The ancestry data 316.1-*n* may include verified ancestry data and single-sided ancestry data. Verified ancestry data includes ancestry data that has been confirmed by both members of the ancestry relationship. A single-sided ancestry relationship has been confirmed by one member of the relationship, but not the other.

For example, as illustrated in FIG. 1A, if Mary 116 and Harry 118 have confirmed to the social networking service that they are husband and wife (e.g., each has affirmatively indicated that they are husband and wife), then Mary and Harry have a verified ancestry relationship. For example, Mary may have indicated that Harry is her husband by adding Harry to her ancestry graph 102, and Harry may have received a pending request to confirm that Mary is his wife, which he accepted. Alternatively, if Mary confirmed the ancestry relationship, but Harry did not confirm the ancestry relationship, then Mary and Harry have a single-sided ancestry relationship.

In some examples, verified ancestry relationships may be visible to all members of the social networking service who have permission to view ancestry information for both of the members of the verified relationship. Single-sided ancestry relationships may be visible only to the subject member who confirmed the relationship, but not to other members. Alternatively, single-sided ancestry relationships between a member and a person who is not a member of the social networking service may be visible to the social contacts of the member who have permission to view information about the member. For example, all of Mary's 116 social contact who have permission to view information about Mary may be able to see that Charlie 120 is Mary's child because Charlie 120 is not a member of the social networking service.

Figure 4:
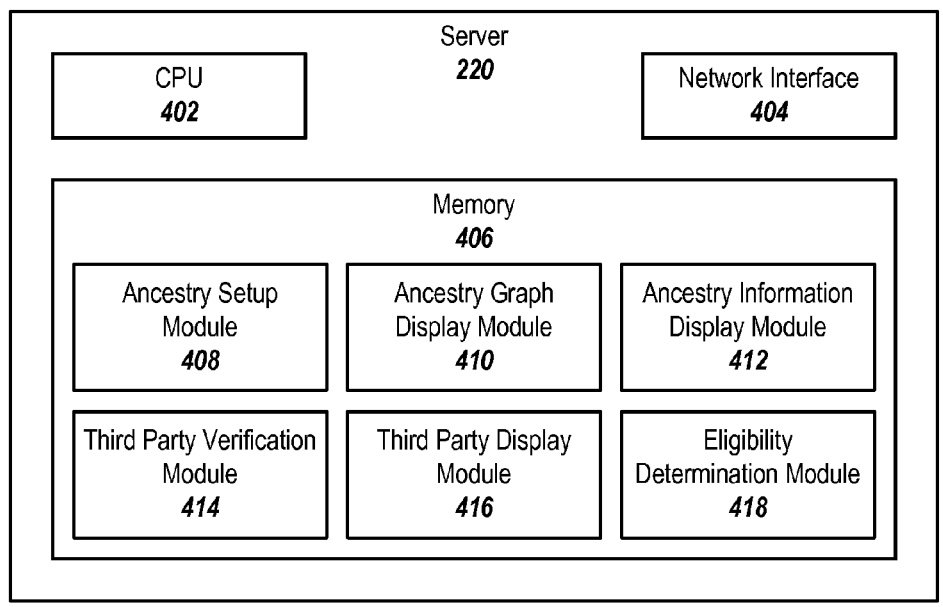
FIG. 4 illustrates an example of the server of FIG. 2.

FIG. 4 illustrates an example of the server 220 of FIG. 2. As shown, the server 220 includes a central processing unit (CPU) 402, a network interface 404, and a memory 406. The CPU 402 may include one or more processors. The CPU 402 is configured to execute computer instructions that are stored in a computer-readable medium, for example, the memory 406. The network interface 404 is configured to allow the server to transmit and receive data in a network, e.g., network 240 of FIG. 2. The network interface 404 may include one or more network interface cards (NICs). The memory 406 stores data or instructions. The memory 406 may be one or more of a cache unit, a storage unit, an internal memory unit, or an external memory unit. As illustrated, the memory 406 includes an ancestry setup module 408, an ancestry graph display module 410, an ancestry information display module 412, a third party verification module 414, a third party display module 416, and an eligibility determination module 418.

The ancestry setup module 408 is configured to receive, via an account associated with a subject user (e.g., Mary 116 of FIG. 1A) of the social networking service, an indication of a subset of social contacts (e.g., Marsha 104, Fred 108, Bill 114, and Harry 118) of the subject user. An ancestry of the subject user includes the subset of social contacts of the subject user. The subset of social contacts of the first user may include a social circle of the subject user that is specified by the subject user. The ancestry setup module is also configured to receive an indication of the ancestry relationships between the subject user and the subset of social contacts of the subject user.

The ancestry graph display module 410 is configured to provide for display, via the account associated with the subject user, a first ancestry graph (e.g., ancestry graph 102) including representations of the subset of the social contacts of the first user and representations of the ancestry relationships among the subset of social contacts.

The ancestry information display module 412 is configured to provide for display, in association with the first ancestry graph, an ancestry graphical component (e.g., diary 122) corresponding to a predetermined time period. The ancestry graphical component includes indications of one or more changes to the ancestry graph within the predetermined time period or indications of one or more posts within the social networking service associated with the subset of the social contacts. The one or more posts are associated with timestamps corresponding to the predetermined time period.

The third party verification module 414 is configured to receive, via an account associated with a member of the subset of social contacts of the subject user (e.g., via the account of Harry 118) a verification of an ancestry relationship between the subject user and the member (e.g., a verification that Mary 116 and Harry 118 are wife and husband).

The third party display module 416 is configured to provide for display, in association with an account associated with a second user (different from Mary 116) a second ancestry graph for the subject user (Mary 116). The second ancestry graph includes a representation of the ancestry relationship between the subject user (Mary 116) and the member (Harry 118). The second user has permission to view information about both the subject user and the member. For example, the second user may be a social contact (e.g., a member of a social circle) of both the subject user and the member.

The ancestry setup module 408 may also be configured to receive, via the account associated with the subject user (e.g., Mary 116), an indication that the ancestry of the subject user includes a person (e.g., Charlie 120) and an indication of the ancestry relationship between the subject user and the person (e.g., Charlie 120 is the child of Mary 116). The person lacks an account in the social networking service. The ancestry graph display module 410 may be configured to provide for display, within the first ancestry graph (e.g., ancestry graph 102), an indication of the ancestry relationship between the subject user and the person.

The eligibility determination module 418 is configured to determine whether the person (e.g., Charlie 120) is eligible for an account in the social networking service. If the person is eligible for the account in the social networking service, the eligibility determination module is configured to associate a representation of the person on the first ancestry graph with a first color code and to provide, to an electronic messaging address (e.g., an email address or a text messaging address) of the person, an invitation to open the account in the social networking service. If the person is ineligible for the account in the social networking service, the eligibility determination module 418 is configured to associate the representation of the person on the first ancestry graph with a second color code. The second color code may be determined based on a reason for ineligibility of the person for the account in the social networking service. The reason for ineligibility of the person for the account in the social networking service may be one or more of: the person is deceased, the person is below a threshold age for joining the social networking service, or the person lacks a known electronic messaging address.

Figure 5:
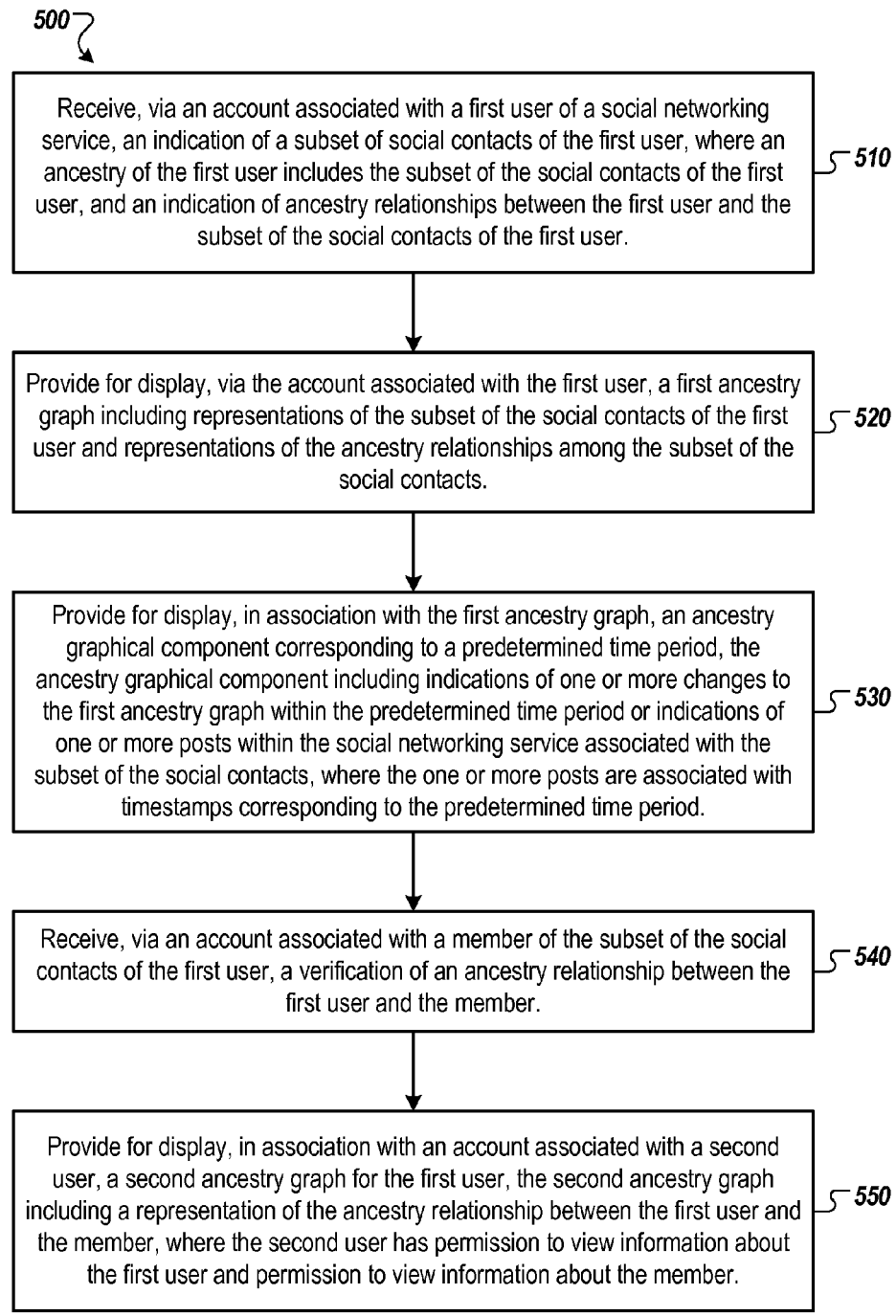
FIG. 5 illustrates an example process by which an ancestry graph may be displayed within a social networking service.

FIG. 5 illustrates an example process 500 by which an ancestry graph may be displayed within a social networking service.

The process 500 begins at step 510, where a server (e.g., server 220) receives, via an account associated with a first user of a social networking service, an indication of a subset of social contacts of the first user. An ancestry of the first user includes the subset of social contacts of the first user. The server also receives an indication of ancestry relationships between the first user and the subset of social contacts of the first user.

In one implementation, the first user may be presented with an interface that presents all or a portion of his/her social contacts or the members of one or more of his/her social circles and be able to select (e.g., using a mouse or a touch screen) members of his/her ancestry from the presented contacts or members, for example, by clicking or touching the representations of the contacts or the members on the display.

In step 520, the server provides for display (e.g., via the client computing device 230), via an account associated with the first user, a first ancestry graph including representations of the subset of the social contacts of the first user and representations of the ancestry relationships among the subset of the social contacts. In some aspects, the ancestry relationships among the subset of the social contacts are determined based on input from the first user and input from at least one member of the subset of the social contacts. For example, the first user may indicate that a member of the subset of the social contacts is his/her father, and the father, who is also a member of the social networking service or has an electronic messaging address, may receive a message requesting that he verify that he is the father of the first user. In some aspects, the first ancestry graph is generated to visually represent parent, child, and spouse relationships among the subset of the social contacts. For example, a parent-child relationship may be represented via a non-horizontal line or set of lines (e.g., the non-horizontal lines between the parents 104 and 106 and the children 112, 114, and 116, the parent 108 and the child 118, and the parents 116 and 118 and the child 120 of ancestry graph 102 of FIG. 1). Spouse relationships may be represented via horizontal lines (e.g., the horizontal lines between the spouses 104 and 106 and the spouses 116 and 118 of ancestry graph 102 of FIG. 1).

In step 530, the server provides for display (e.g., via the client computing device 230), in association with the first ancestry graph, an ancestry graphical component (e.g., diary 122) corresponding to a predetermined time period. The ancestry graphical component includes indications of one or more changes to the first ancestry graph within the predetermined time period or indications of one or more posts within the social networking service associated with the subset of social contacts. The one or more posts are associated with one or more timestamps corresponding to the predetermined time period. In some aspects, the process 600 by which a person who lacks an account in a social networking service may be added to an ancestry graph, described in conjunction with FIG. 6, below, may be initiated after completion of step 530.

In step 540, the server receives, via an account associated with a member of the subset of social contacts of the first user, a verification of the ancestry relationship between the first user and the member.

In step 550, the server provides for display, in association with an account associated with a second user, a second ancestry graph for the first user. The second ancestry graph includes a representation of the ancestry relationship between the first user and the member based on the member having verified the ancestry relationship. The second user has permission to view information about the first user and permission to view information about the member. After step 550, the process 500 ends.

Figure 6:
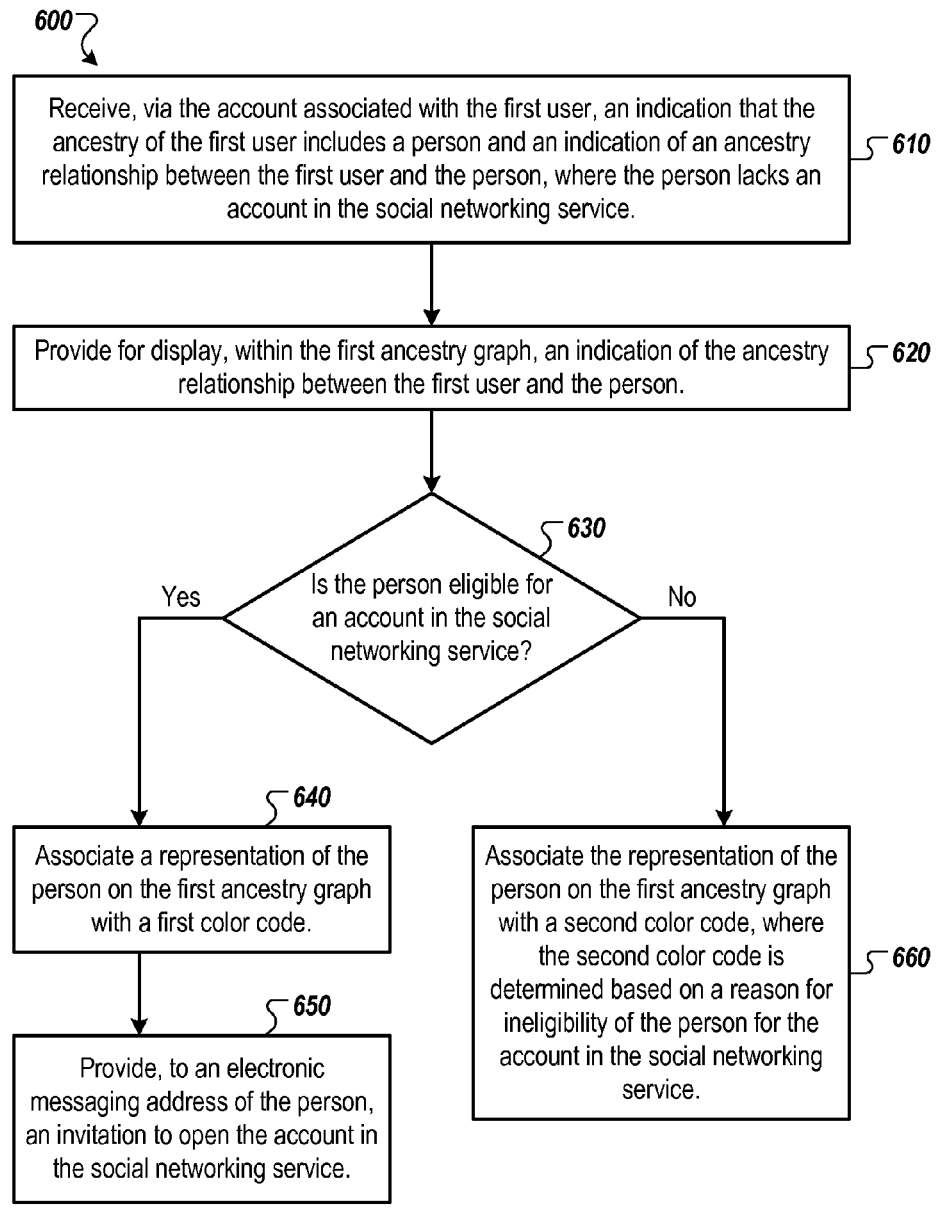
FIG. 6 illustrates an example process by which a person who lacks an account in a social networking service may be added to an ancestry graph.

FIG. 6 illustrates an example process 600 by which a person who lacks an account in a social networking service may be added to an ancestry graph. The process 600 may be initiated, for example, after step 530 of process 500.

The process 600 begins at step 610, where a server (e.g., server 220) receives, via an account associated with a first user (e.g., the account of the first user of process 500 of FIG. 5), an indication that an ancestry of the first user includes a person and an indication of an ancestry relationship between the first user and the person, where the person lacks an account in a social networking service.

In step 620, the server provides for display, within a first ancestry graph, an indication of the ancestry relationship between the first user and the person.

In step 630, the server determines whether the person is eligible for an account in the social networking service. If the person is eligible for the account, the process 600 continues to step 640. If the person is not eligible for the account, the process 600 continues to step 660.

In step 640, if the person is eligible for the account, the server associates a representation of the person on the first ancestry graph with a first color code.

In step 650, the server provides, to an electronic messaging address of the person, an invitation to open the account in the social networking service. After step 650, the process 600 ends.

In step 660, if the person is ineligible for the account, the server associates the representation of the person on the first ancestry graph with a second color code. The second color code is determined based on a reason for ineligibility of the person for the account in the social networking service. After step 660, the process 600 ends.

Although certain examples provided herein describe a user's information being stored in memory, the user can delete the user information from memory and/or opt out of having the user information stored in memory. In example aspects, the user can adjust appropriate privacy settings to selectively limit the types of user information stored in memory, or select the memory in which the user information is stored (e.g., locally on the user's device as opposed to remotely a server). In example aspects, the user information does not include and/or share the specific identification of the user (e.g., the user's name) unless otherwise specifically provided or directed by the user.

In various aspects, the subject disclosure provides for accessing information stored about users (e.g., user location data, user web usage history, user endorsements, etc.). In such cases, a user may opt-out of having the system (e.g., a server or a data repository) store the user information or the user may need to provide affirmative permission to have the system store or access the user information as discussed for the various aspects.

Figure 7:
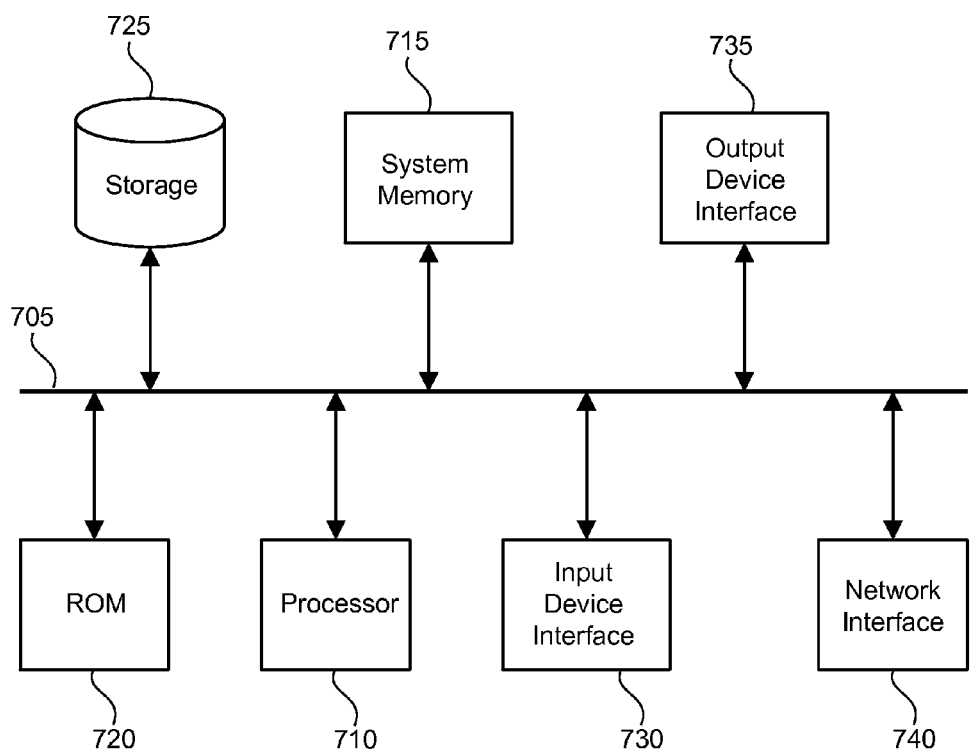
FIG. 7 conceptually illustrates an example electronic system with which some implementations of the subject technology are implemented.

FIG. 7 conceptually illustrates an electronic system 700 with which some implementations of the subject technology are implemented. For example, one or more of the data repository 210, the server 220, or the client computing device 230 may be implemented using the arrangement of the electronic system 700. The electronic system 700 can be a computer (e.g., a mobile phone, PDA), or any other sort of electronic device. Such an electronic system includes various types of computer readable media and interfaces for various other types of computer readable media. Electronic system 700 includes a bus 705, processing unit(s) 710, a system memory 715, a read-only memory 720, a permanent storage device 725, an input device interface 730, an output device interface 735, and a network interface 740.

The bus 705 collectively represents all system, peripheral, and chipset buses that communicatively connect the numerous internal devices of the electronic system 700. For instance, the bus 705 communicatively connects the processing unit(s) 710 with the read-only memory 720, the system memory 715, and the permanent storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some implementations of the subject technology use a mass-storage device (for example a magnetic or optical disk and its corresponding disk drive) as the permanent storage device 725.

Other implementations use a removable storage device (for example a floppy disk, flash drive, and its corresponding disk drive) as the permanent storage device 725. Like the permanent storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the processes of the subject technology are stored in the system memory 715, the permanent storage device 725, or the read-only memory 720. For example, the various memory units include instructions for displaying an ancestry graph within a social networking service in accordance with some implementations. From these various memory units, the processing unit(s) 710 retrieves instructions to execute and data to process in order to execute the processes of some implementations.

The bus 705 also connects to the input and output device interfaces 730 and 735. The input device interface 730 enables the user to communicate information and select commands to the electronic system. Input devices used with input device interface 730 include, for example, alphanumeric keyboards and pointing devices (also called "cursor control devices"). Output device interfaces 735 enables, for example, the display of images generated by the electronic system 700. Output devices used with output device interface 735 include, for example, printers and display devices, for example cathode ray tubes (CRT) or liquid crystal displays (LCD). Some implementations include devices for example a touch screen that functions as both input and output devices.

Finally, as shown in FIG. 7, bus 705 also couples electronic system 700 to a network (not shown) through a network interface 740. In this manner, the electronic system 700 can be a part of a network of computers (for example a local area network ("LAN"), a wide area network ("WAN"), or an Intranet, or a network of networks, for example the Internet. Any or all components of electronic system 700 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method comprising:
   receiving, via an account associated with a first user of a social networking service, an indication of a subset of social contacts of the first user, wherein an ancestry of the first user comprises the subset of the social contacts of the first user, and an indication of ancestry relationships between the first user and the subset of the social contacts of the first user;
   providing for display, via the account associated with the first user, a first ancestry graph comprising representations of the subset of the social contacts of the first user and representations of the ancestry relationships among the subset of the social contacts;
   providing for display, in association with the first ancestry graph, an ancestry graphical component corresponding to a predetermined time period, the ancestry graphical component comprising indications of one or more changes to the first ancestry graph within the predetermined time period or indications of one or more posts within the social networking service associated with the subset of the social contacts, wherein the one or more posts are associated with timestamps corresponding to the predetermined time period;
   receiving, via the account associated with the first user, an indication that the ancestry of the first user comprises a person and an indication of an ancestry relationship between the first user and the person, wherein the person lacks an account in the social networking service;

providing for display, within the first ancestry graph, an indication of the ancestry relationship between the first user and the person;
determining whether the person is eligible for an account in the social networking service;
if the person is eligible for the account in the social networking service:
associating a representation of the person on the first ancestry graph with a first color code; and
providing, to an electronic messaging address of the person, an invitation to open the account in the social networking service; and
if the person is ineligible for the account in the social networking service:
associating the representation of the person on the first ancestry graph with a second color code, wherein the second color code is determined based on a reason for ineligibility of the person for the account in the social networking service.

2. The method of claim 1, wherein the ancestry relationships among the subset of the social contacts are determined based on input from the first user and input from at least one member of the subset of the social contacts.

3. The method of claim 1, wherein the first ancestry graph is generated to visually represent parent, child, and spouse relationships among the subset of the social contacts.

4. The method of claim 1, further comprising:
receiving, via an account associated with a member of the subset of the social contacts of the first user, a verification of an ancestry relationship between the first user and the member; and
providing for display, in association with an account associated with a second user, a second ancestry graph for the first user, the second ancestry graph comprising a representation of the ancestry relationship between the first user and the member, wherein the second user has permission to view information about the first user and permission to view information about the member.

5. The method of claim 1, wherein the subset of social contacts of the first user comprise a social circle of the first user.

6. The method of claim 1, wherein the reason for ineligibility of the person for the account in the social networking service comprises one or more of: the person is deceased, the person is below a threshold age for joining the social networking service, or the person lacks a known electronic messaging address.

7. The method of claim 1, wherein the ancestry relationship comprises one or more of: spouse, sibling, parent, or child.

8. A non-transitory computer-readable medium comprising instructions which, when implemented by one or more computers, cause the one or more computers to implement a method, the method comprising:
receiving, via an account associated with a first user of a social networking service, an indication of a subset of social contacts of the first user, wherein an ancestry of the first user comprises the subset of the social contacts of the first user, and an indication of ancestry relationships between the first user and the subset of the social contacts of the first user;
providing for display, via the account associated with the first user, a first ancestry graph comprising representations of the subset of the social contacts of the first user and representations of the ancestry relationships among the subset of the social contacts;
providing for display, in association with the first ancestry graph, an ancestry graphical component comprising additional information about the subset of social contacts of the first user;
receiving, via the account associated with the first user, an indication that the ancestry of the first user comprises a person and an indication of an ancestry relationship between the first user and the person, wherein the person lacks an account in the social networking service; and
providing for display, within the first ancestry graph, an indication of the ancestry relationship between the first user and the person;
determining whether the person is eligible for the account in the social networking service;
if the person is eligible for the account in the social networking service:
associating a representation of the person on the first ancestry graph with a first color code; and
providing, to an electronic messaging address of the person, an invitation to open the account in the social networking service; and
if the person is ineligible for an account in the social networking service:
associating the representation of the person on the first ancestry graph with a second color code, wherein the second color code is determined based on a reason for ineligibility of the person for the account in the social networking service.

9. The computer-readable medium of claim 8, wherein the ancestry graphical component corresponds to a predetermined time period, wherein the ancestry graphical component comprises indications of one or more changes to the first ancestry graph within the predetermined time period or indications of one or more posts within the social networking service associated with the subset of the social contacts, and wherein the one or more posts are associated with timestamps corresponding to the predetermined time period.

10. The computer-readable medium of claim 8, wherein the method further comprises:
receiving, via an account associated with a member of the subset of the social contacts of the first user, a verification of an ancestry relationship between the first user and the member; and
providing for display, in association with an account associated with a second user, a second ancestry graph for the first user, the second ancestry graph comprising a representation of the ancestry relationship between the first user and the member, wherein the second user has permission to view information about the first user and permission to view information about the member.

11. The computer-readable medium of claim 8, wherein the subset of social contacts of the first user comprise a social circle of the first user.

12. The computer-readable medium of claim 8, wherein the reason for ineligibility of the person for the account in the social networking service comprises one or more of: the person is deceased, the person is below a threshold age for joining the social networking service, or the person lacks a known electronic messaging address.

13. The computer-readable medium of claim 8, wherein the ancestry relationship comprises one or more of: spouse, sibling, parent, or child.

14. A system comprising:
an ancestry setup module configured to receive, via an account associated with a first user of a social networking service, an indication of a subset of social contacts of the first user, wherein an ancestry of the first user comprises the subset of the social contacts of the first user, and an indication of ancestry relationships between the first user and the subset of the social contacts of the first user, wherein the ancestry setup module is further configured to receive, via the account associated with the first user, an indication that the ancestry of the first user comprises a person and an indication of an ancestry relationship between the first user and the person, wherein the person lacks an account in the social networking service;

an ancestry graph display module configured to provide for display, via the account associated with the first user, a first ancestry graph comprising representations of the subset of the social contacts of the first user and representations of the ancestry relationships among the subset of the social contacts, wherein the ancestry graph display module is further configured to providing for display, within the first ancestry graph, an indication of the ancestry relationship between the first user and the person;

an ancestry information display module configured to provide for display, in association with the first ancestry graph, an ancestry graphical component corresponding to a predetermined time period, the ancestry graphical component comprising indications of one or more changes to the first ancestry graph within the predetermined time period or indications of one or more posts within the social networking service associated with the subset of the social contacts, wherein the one or more posts are associated with timestamps corresponding to the predetermined time period;

a third-party verification module configured to receive, via an account associated with a member of the subset of the social contacts of the first user, a verification of an ancestry relationship between the first user and the member;

a third-party display module configured to provide for display, in association with an account associated with a second user, a second ancestry graph for the first user, the second ancestry graph comprising a representation of the ancestry relationship between the first user and the member, wherein the second user has permission to view information about the first user and permission to view information about the member; and an eligibility determination module configured to:
    determine whether the person is eligible for an account in the social networking service;
    if the person is eligible for the account in the social networking service:
        associate a representation of the person on the first ancestry graph with a first color code; and
        provide, to an electronic messaging address of the person, an invitation to open the account in the social networking service; and
    if the person is ineligible for the account in the social networking service:
        associate the representation of the person on the first ancestry graph with a second color code, wherein the second color code is determined based on a reason for ineligibility of the person for the account in the social networking service.

15. The system of claim 14, wherein the subset of social contacts of the first user comprise a social circle of the first user.

16. The system of claim 14, wherein the reason for ineligibility of the person for the account in the social networking service comprises one or more of: the person is deceased, the person is below a threshold age for joining the social networking service, or the person lacks a known electronic messaging address.

* * * * *